US012770650B2

(12) United States Patent
Nishida et al.

(10) Patent No.: US 12,770,650 B2
(45) Date of Patent: Oct. 20, 2026

(54) DISK DRIVE SUSPENSION, ADJUSTMENT METHOD OF VIBRATION CHARACTERISTICS OF THE SAME, AND MANUFACTURING METHOD OF THE SAME

(71) Applicant: NHK SPRING CO., LTD., Yokohama (JP)

(72) Inventors: Tatsuhiko Nishida, Yokohama (JP); Toshiki Ando, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 738 days.

(21) Appl. No.: 17/965,852

(22) Filed: Oct. 14, 2022

(65) Prior Publication Data

US 2023/0117866 A1 Apr. 20, 2023

(30) Foreign Application Priority Data

Oct. 20, 2021 (JP) ................................ 2021-171799

(51) Int. Cl.
*G11B 5/48* (2006.01)
*G11B 33/08* (2006.01)

(52) U.S. Cl.
CPC .......... *G11B 5/4833* (2013.01); *G11B 5/4826* (2013.01); *G11B 33/08* (2013.01)

(58) Field of Classification Search
None
See application file for complete search history.

(56) References Cited

U.S. PATENT DOCUMENTS 6,388,843 B1 5/2002 Takagi et al.
6,967,821 B2 11/2005 Himes et al.
7,336,444 B2 2/2008 Kido et al.
8,085,508 B2 12/2011 Hatch
10,991,388 B1 4/2021 Yamada
11,074,932 B1 * 7/2021 Suzuki et al. ....... G11B 5/4833
11,170,822 B2 11/2021 Nakayama et al.
(Continued)

FOREIGN PATENT DOCUMENTS

CN 101546562 A 9/2009
CN 112802503 A 5/2021
(Continued)

OTHER PUBLICATIONS

Chinese Office Action (and an English language translation thereof) dated Feb. 25, 2025, issued in counterpart Chinese Application No. 202211242597.1.

(Continued)

*Primary Examiner* — Craig A. Renner
(74) *Attorney, Agent, or Firm* — Holtz, Holtz & Volek PC

(57) ABSTRACT

A disk drive suspension according to an embodiment comprises a load beam comprising a dimple, and a flexure overlaid on the load beam. The load beam and the flexure are fixed by a first fixing portion and a second fixing portion closer to a distal end of the load beam than the first fixing portion. The flexure comprises a tongue opposed to the dimple, and an outrigger connected to the tongue. The outrigger is bent in a thickness direction of the load beam at a bent portion located between the dimple and the first fixing portion in a length direction of the load beam.

13 Claims, 9 Drawing Sheets

(56) References Cited

U.S. PATENT DOCUMENTS

| | | | | |
|---|---|---|---|---|
| 11,176,961 | B2 * | 11/2021 | Suzuki et al. | G11B 5/4833 |
| 11,410,707 | B2 | 8/2022 | Nakayama et al. | |
| 12,020,732 | B2 * | 6/2024 | Phu et al. | G11B 5/4833 |
| 2005/0157428 | A1 | 7/2005 | Choi | |
| 2007/0247760 | A1 | 10/2007 | Hanya et al. | |
| 2007/0297093 | A1 | 12/2007 | Deguchi et al. | |
| 2009/0154022 | A1 | 6/2009 | Takikawa | |
| 2009/0195934 | A1 | 8/2009 | Furui et al. | |
| 2010/0079915 | A1 | 4/2010 | Kido | |
| 2020/0279579 | A1 * | 9/2020 | Nakayama et al. | G11B 5/4833 |
| 2021/0241802 | A1 * | 8/2021 | Nakayama et al. | G11B 25/043 |
| 2021/0287698 | A1 * | 9/2021 | Yamada | G11B 5/4833 |
| 2023/0123177 | A1 * | 4/2023 | Senda et al. | G11B 5/4833<br>360/244.2 |

FOREIGN PATENT DOCUMENTS

| | | | |
|---|---|---|---|
| JP | 2000195209 | A | 7/2000 |
| JP | 2006221726 | A | 8/2006 |
| JP | 2007323685 | A | 12/2007 |
| JP | 2009151839 | A | 7/2009 |
| JP | 2009181683 | A | 8/2009 |
| JP | 2010086630 | A | 4/2010 |
| JP | 2021144770 | A | 9/2021 |

OTHER PUBLICATIONS

Japanese Office Action (and an English language translation thereof) dated Jul. 8, 2025, issued in counterpart Japanese Application No. 2021-171799.

* cited by examiner

DISK DRIVE SUSPENSION, ADJUSTMENT METHOD OF VIBRATION CHARACTERISTICS OF THE SAME, AND MANUFACTURING METHOD OF THE SAME

CROSS-REFERENCE TO RELATED APPLICATIONS

This application is based upon and claims the benefit of priority from prior Japanese Patent Application No. 2021-171799, filed Oct. 20, 2021, the entire contents of which are incorporated herein by reference.

BACKGROUND OF THE INVENTION

1. Field of the Invention

The present invention relates to a disk drive suspension used in a hard disk drive, etc., an adjustment method of the vibration characteristics of the disk drive suspension, and a manufacturing method of the disk drive suspension.

2. Description of the Related Art

Hard disk drives (HDDs) are used in information processing apparatuses such as personal computers. A hard disk drive comprises a magnetic disk which rotates around a spindle, a carriage which turns on a pivot, etc. The carriage comprises an actuator arm and is turned on the pivot in a track-width direction of the disk by a positioning motor such as a voice coil motor.

A disk drive suspension (hereinafter, simply referred to as a suspension) is mounted on the actuator arm. The suspension includes a load beam, a flexure overlaid on the load beam, etc. A slider constituting a magnetic head is provided in a gimbal portion formed in the vicinity of the distal end of the flexure. The slider is provided with elements (transducers) for accessing data, for example, reading or writing data. The load beam, the flexure, the slider, etc., constitute a head gimbal assembly.

The gimbal portion includes a tongue on which the slider is mounted, and a pair of outriggers formed on both sides of the tongue. The outriggers have shapes projecting outside both sides of the flexure, respectively. The vicinities of both end portions in the length direction of each of the outriggers are fixed to the load beam by, for example, laser welding. Each of the outriggers can bend like a spring in their thickness direction and has an important role in securing the gimbal movement of the tongue.

To allow for an increase in the recording density of the disk, the head gimbal assembly needs to be made more smaller and be positioned on a recording surface of the disk more precisely. For that purpose, it is necessary to reduce the vibrations of the flexure as much as possible while securing the gimbal movement required of the head gimbal assembly. For example, as disclosed in U.S. Pat. No. 6,967,821 B2, JP 2006-221726 A and JP 2010-86630 A, providing a damper member at part of a flexure to suppress the vibrations of a flexure also has been known.

If a damper member is attached to the flexure, the vibrations of the flexure can be suppressed, whereas the stiffness of the flexure changes. This change can have an unfavorable influence on the gimbal movement. In addition, since the step of attaching the damper member is necessary, the manufacturing cost of the suspension increases.

BRIEF SUMMARY OF THE INVENTION

One of the objects of the present invention is to provide a disk drive suspension which can suppress the vibrations of a flexure effectively and which is excellent in performance.

According to an embodiment, a disk drive suspension comprises a load beam comprising a dimple, and a flexure overlaid on the load beam. The load beam and the flexure are fixed by a first fixing portion and a second fixing portion closer to a distal end of the load beam than the first fixing portion. The flexure comprises a tongue opposed to the dimple, and an outrigger connected to the tongue. The outrigger is bent in a thickness direction of the load beam at a bent portion located between the dimple and the first fixing portion in a length direction of the load beam.

For example, the bent portion is located between the tongue and the first fixing portion in the length direction. The outrigger may comprise a first face, at least part of which is opposed to the load beam, and a second face opposite to the first face in the thickness direction, and may be bent at the bent portion to make the first face convex.

The outrigger may include a first outrigger and a second outrigger arranged in a width direction of the load beam. In this case, the tongue may be located between the first outrigger and the second outrigger in the width direction, and each of the first outrigger and the second outrigger may comprise the bent portion.

According to another embodiment, an adjustment method of a vibration characteristic of the disk drive suspension comprises: measuring a first gain of the flexure in a case where the bent portion is not formed on the outrigger in a specific vibration mode; measuring a second gain of the flexure in a case where the bent portion is formed on the outrigger in the specific vibration mode, the second gain being measured for each of positions on the outrigger at which the bent portion is formed; and determining a position with which the second gain smaller than the first gain is obtained, of the positions, as a formation position of the bent portion applied to the disk drive suspension to be manufactured.

For example, the first gain and the second gain of each of the positions may be measured for each of vibration modes. In this case, a position with which the second gain smaller than the first gain is obtained in at least one of the vibration modes, of the positions, may be determined as the formation position of the bent portion applied to the disk drive suspension to be manufactured.

According to yet another embodiment, an adjustment method of a vibration characteristic of the disk drive suspension comprises: measuring a first gain of the flexure in a case where the bent portion is not formed on the outrigger in a specific vibration mode; measuring a second gain of the flexure in a case where the bent portion is formed on the outrigger in the specific vibration mode, the second gain being measured for each of bending angles of the outrigger at the bent portion; and determining a bending angle with which the second gain smaller than the first gain is obtained, of the bending angles, as a bending angle at the bent portion applied to the disk drive suspension to be manufactured.

For example, the first gain and the second gain of each of the bending angles may be determined for each of vibration modes. In this case, a bending angle with which the second gain smaller than the first gain is obtained in at least one of the vibration modes, of the bending angles, may be determined as the bending angle at the bent portion applied to the disk drive suspension to be manufactured.

According to yet another embodiment, a manufacturing method comprises manufacturing a disk drive suspension whose vibration characteristic is adjusted by the above-described adjustment method.

The present invention can provide a disk drive suspension which can suppress the vibrations of a flexure effectively and is excellent in performance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the drawings.

Figure 1:
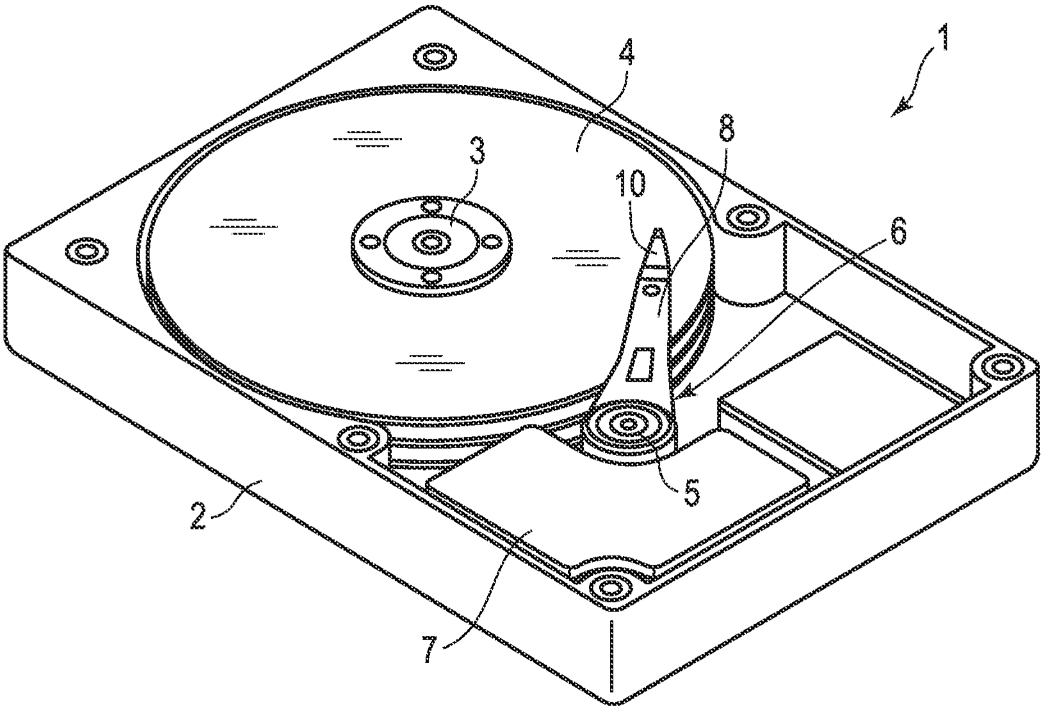
FIG. 1 is a schematic perspective view showing an example of a disk drive according to an embodiment.

FIG. 1 is a schematic perspective view showing an example of a disk drive (HDD) 1. The disk drive 1 comprises a case 2, disks 4 which rotate around a spindle 3, a carriage 6 which can turn on a pivot 5, and a positioning motor (voice coil motor) 7 for actuating the carriage 6. The case 2 is sealed by a lid not shown in the figure.

Figure 2:
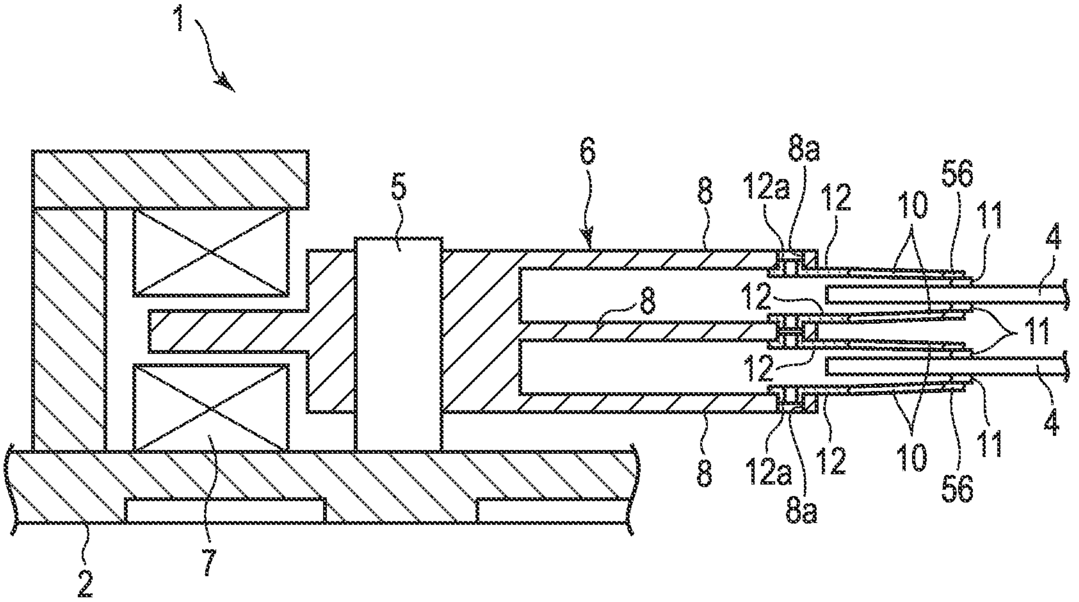
FIG. 2 is a schematic cross-sectional view of the disk drive shown in FIG. 1.

FIG. 2 is a schematic cross-sectional view showing part of the disk drive 1. As shown in FIG. 1 and FIG. 2, the carriage 6 is provided with arms (carriage arms) 8. On the distal end portions of the arms 8, suspensions 10 are mounted. The distal end portions of the suspensions 10 are provided with sliders 11, which constitute magnetic heads. When the disks 4 rotate at high speed, an influx of air into the space between the disks 4 and the sliders 11 forms an air bearing.

In the example of FIG. 2, the suspensions 10 comprise base plates 12. On the base plates 12, boss portions 12*a* inserted info holes 8*a* formed in the arms 8 are formed.

When the carriage 6 is turned by the positioning motor 7, the suspensions 10 move in the radial direction of the disks 4, and the sliders 11 thereby move to desired tracks on the disks 4.

Figure 3:
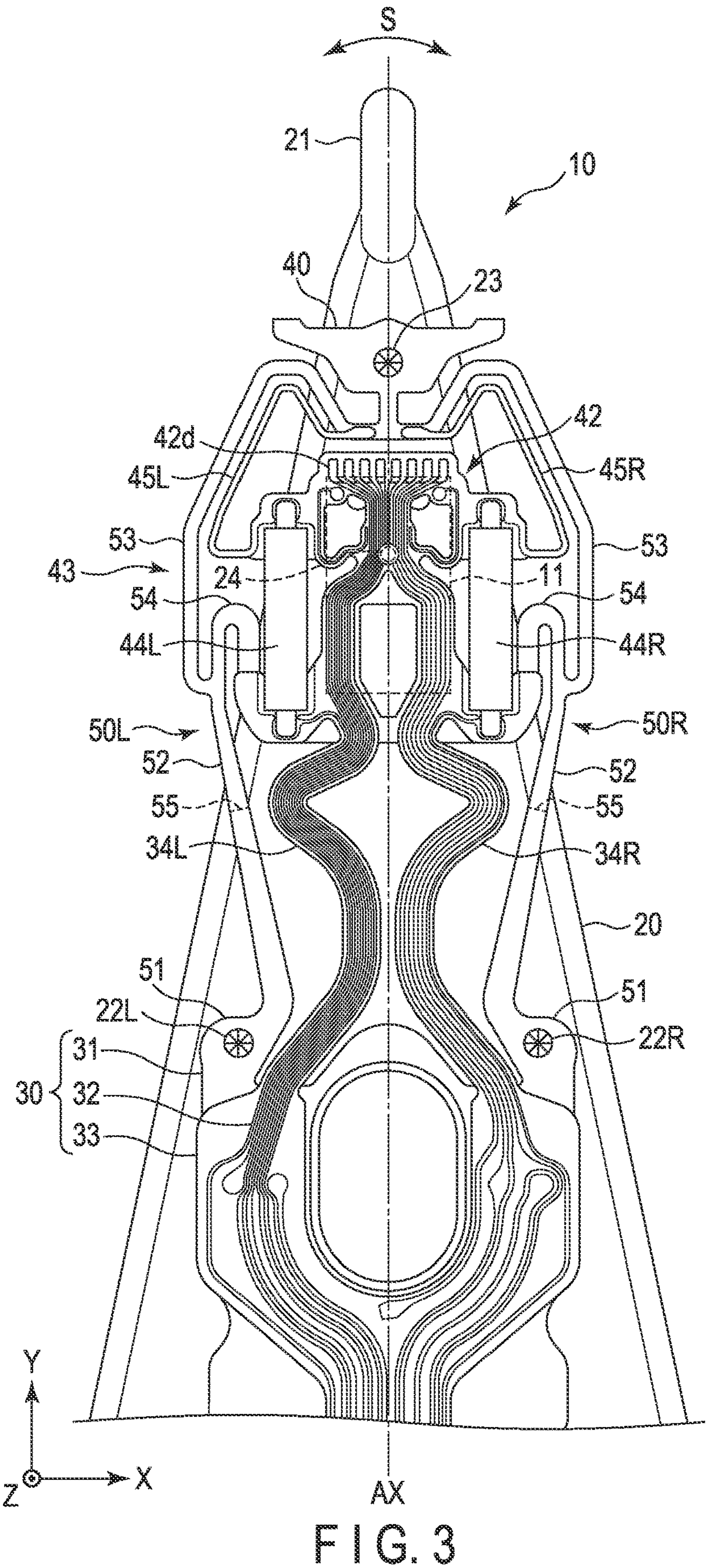
FIG. 3 is a schematic plan view of a suspension according to the embodiment.

FIG. 3 is a schematic plan view of the suspension 10 according to the present embodiment. The suspension 10 comprises a load beam 20 and a flexure 30. In the present embodiment, a width direction X, a length direction Y, and a thickness direction Z which are orthogonal to each other are defined as shown in the figure. In addition, a sway direction S is defined as indicated by an arc-shaped arrow in the vicinity of the distal end of the load beam 20. The load beam 20, the flexure 30, and the suspension 10 each have a shape long in the length direction Y.

The length direction Y is parallel to a central axis AX of the suspension 10. The load beam 20 and the flexure 30 have shapes that are substantially axisymmetric to each other with respect to the central axis AX.

The load beam 20 is formed of a metallic material into the shape of a flat plate. A tab 21 is provided at the distal end of the load beans 20. The load bean 20 has a planar shape tapering toward the tab 21. The load beam 20 is coupled to the base plate 12 shown in FIG. 2.

The flexure 30 is overlaid on the load beam 20. The flexure 20 comprises a metal base 31, a circuit layer 32, and an insulating layer 33. The metal base 31 is formed of a metallic material, for example, stainless steel, and most of the metal base 31 is opposed to the lead beam 20.

The thickness of the metal base 31 is smaller than the thickness of the load beam 20. The thickness of the metal base 31 should preferably be 12 μm to 25 μm, and is, for example, 20 μm. The thickness of the load beam 20 is, for example, 20 μm.

The load beam 20 and the metal base 31 are fixed together by a pair of first fixing portions 22L and 22R and a second fixing portion 23. For example, laser spot welding can be used as a fixing method in the fixing portions 22L, 22R, and 23. The first fixing portions 22L and 22R are arranged in the width direction X. The distances from the first fixing portions 22L and 22R to the central axis AX are equal. The second fixing portion 23 is provided at a position closer to the tab 21 (distal end of the load beam 20) than the first fixing portions 22L and 22R. The second fixing portion 23 is located on the central axis AX.

The circuit layer 32 includes wires formed of metallic materials having excellent electrical conductivity, for example, copper. The insulating layer 33 includes layers such as a layer underlying each wire and a layer covering each wire. These layers can be formed of, for example, polyimide.

Most of the circuit layer 32 and the insulating layer 33 are forced on the metal base 31. In the example of FIG. 3, the circuit layer 32 and the insulating layer 33 include portions not supported by the metal base 31, such as a pair of unsupported circuit portions 34L and 34R.

Figure 4:
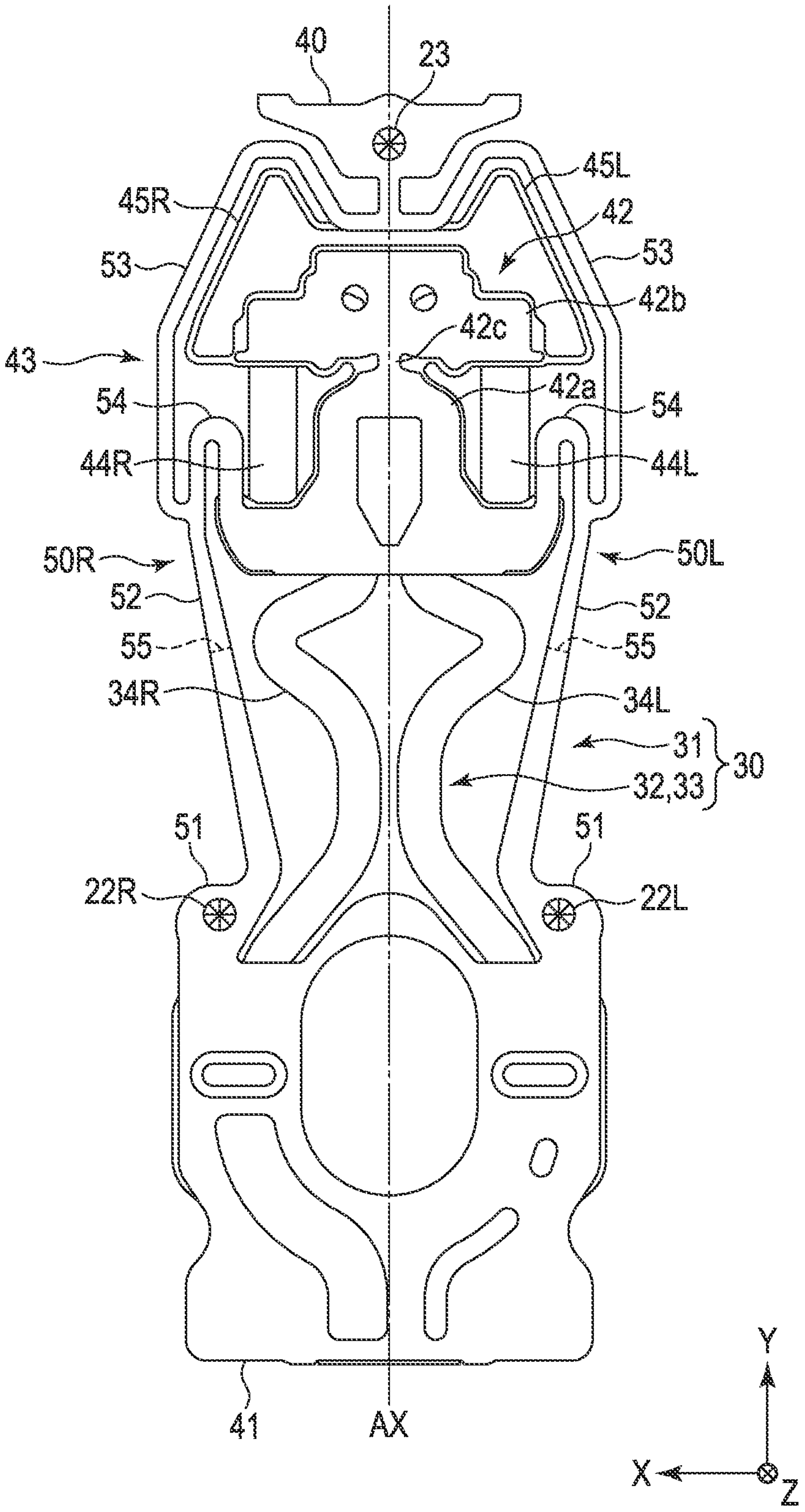
FIG. 4 is a schematic plan view of a flexure according to the embodiment.

FIG. 4 is a schematic plan view of the flexure 30 from the perspective of the metal base 31 side. As shown in FIG. 3 and FIG. 4, the metal base 31 comprises a distal end portion 40 and a proximal end portion 41 which are spaced apart in the length direction Y. As shown in FIG. 3, the distal end portion 40 is located in the vicinity of the tab 21 and fixed to the load beam 20 by the above-described second fixing portion 23.

The flexure 30 further comprises a tongue 42, a first outrigger 50L, and a second outrigger 50R. In most of the tongue 42, the insulating layer 33 is stacked on the metal base 31. In the examples of FIG. 3 and FIG. 4, the outriggers 50L and 50R are formed by the metal base 31. That is, the outriggers 50L and 50R do not include the circuit layer 32 and the insulating layer 33.

The tongue 42 is located between the distal end portion 40 and the proximal end portion 41 in the length direction Y. The outriggers 50L and 50R are placed outside both sides of the tongue 42 in the width direction X, respectively. That is, the tongue 42 is located between the first outrigger 50L and the second outrigger 50R in the width direction x.

In the example of FIG. 4, the tongue 42 comprises a first portion 42*a*, a second portion 42*b*, and a connection portion 42*c* connecting the first portion 42*a* and the second portion 42*b*. The second portion 42*b* is located between the first portion 42*a* and the distal end portion 40 in the length direction Y. The width of the connection portion 42*c* is smaller than those of the first portion 42*a* and the second portion 42*b*.

As shown in FIG. 3, the slider 11 is mounted on the tongue 42. The tongue 42 comprises terminals 42*d* used to electrically connect to the slider 11. The terminals 42*d* are provided in the second portion 42*b*.

The slider 11 comprises elements which can covert magnetic and electrical signals into each other, for example, MR elements. These elements access the disk 4, for example, write or read data to or from the disk 4. The slider 11, the load beam 20, and the flexure 30, etc., constitute a head gimbal assembly.

As shown in FIG. 3, a dimple 24 projecting toward the tongue 42 is formed in the vicinity of the distal end of the load beam 20. The dimple 24 is located on the central axis AX. The distal end of the dimple 24 is in contact with the tongue 42. The tongue 42 swings on the distal end of the dimple 24 and can make a desired gimbal movement. The tongue 42, the outriggers 50L and 50R, the dimple 24, etc., constitute a gimbal portion 43.

The first outrigger 50L comprises a proximal end portion 51, a proximal end arm 52, a distal end arm 63, and a connection portion 54. The proximal end portion 51 is fixed to the load beam 20 by the first fixing portion 22L. The proximal end arm 52 extends from the proximal end portion 51 toward the side of the tongue 42. In the examples of FIG. 3 and FIG. 4, the proximal end arm 52 is inclined with respect to the length direction Y to become further away from the central axis AX as it gets closer to the tongue 42. One end of the distal end arm 53 is connected to the proximal end arm 52, and the other end is connected to the distal end portion 40. The connection portion 54 is curved into a U-shape and connects the distal end of the proximal end arm 52 and the first portion 42*a* of the tongue 42.

The second outrigger 50R has a shape that is axisymmetric to the first outrigger 50L with respect to the central axis AX. That is, the second outrigger 50R comprises a proximal end portion 51, a proximal end arm 52, a distal end arm 53, and a connection portion 54. The proximal end portion 51 is fixed to the load beam 20 by the first fixing portion 22R. In the examples of FIG. 3 and FIG. 4, the respective distal end arms 53 of the outriggers 50L and 50R are united on the central axis AX between the distal end portion 40 and the tongue 42 and are connected to the distal end portion 40.

The first outrigger 50L can bend in the thickness direction Z between the first fixing portion 22L and the second fixing portion 23. Similarly, the second outrigger 50R can bend in the thickness direction Z between the first fixing portion 22R and the second fixing portion 23. The tongue 42 is elastically supported by the outriggers 50L and 50R and can swing on the dimple 24.

As shown in FIG. 3 and FIG. 4, a pair of microactuator elements 44L and 44R is mounted on the gimbal portion 43. The microactuator elements 44L and 44R are each made of a piezoelectric material, and are placed on both sides of the slider 11 in the width direction X. One end of the microactuator element 44L in the length direction Y is connected to the first portion 42*a* of the tongue 42, and the other end is connected to the second portion 42*b* of the tongue 42. Similarly, one end of the microactuator element 44R in the length direction Y is connected to the first portion 42*a*, and the other end is connected to the second portion 42*b*.

The microactuator elements 44L and 44R have the function of turning the tongue 42 in the sway direction S. In the examples of FIG. 3 and FIG. 4, limiter members 45L and 45R which suppress the excessive swing of the tongue 42 are provided. One end of the limiter member 45L is connected to the second portion 42*b* of the tongue 42, and the other end is connected to the distal end arm 53 of the first outrigger 50L. One end of the limiter member 45R is connected to the second portion 42*b* of the tongue 42, and the other end is connected to the distal end arm 53 of the second outrigger 50R. The limiter members 45L and 45R can be formed by, for example, the insulating layer 33.

The outriggers 50L and 50R are bent in the thickness direction Z at bent portions 55, respectively. In the examples of FIG. 3 and FIG. 4, the bent portions 55 are located in the proximal end arms 52 of the outriggers 50L and 50R, respectively.

Figure 5:
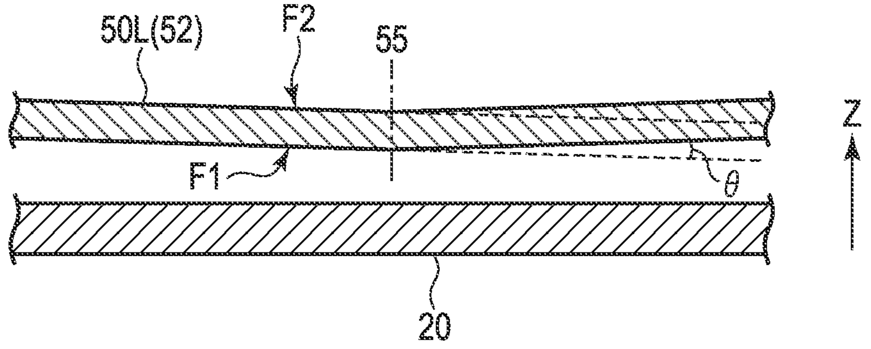
FIG. 5 is a schematic cross-sectional view of an outrigger including a bent portion and a load bean according to the embodiment.

FIG. 5 is a schematic cross-sectional view of the first outrigger 50L (proximal end arm 52) including the bent portion 55 and the load beam 20. The proximal end arm 52 comprises a first face F1 opposed to the load beam 20 and a second face F2 opposite to the first face F1. The proximal end arm 52 is bent at the bent portion 55 to make the first face F1 convex. It is also possible to say that the proximal end arm 52 is bent to be convex toward the load bean 20.

Various values can be adopted as a bending angle θ of the proximal end arm 52 at the bent portion 55, and for example, the bending angle θ is 0.5° to 3°. For example, the bending angle θ corresponds to the angle at which the first face F1 or the second face F2 changes at the bent portion 55. The proximal end arm 52 may be bent smoothly to have a curvature at the bent portion 55.

It is not necessarily required that the bent portion 55 be provided at a position opposed to the load beam 20 as shown in FIG. 5. That is, the bent portion 55 may be provided at a portion projecting toward the side of the load beam 20 of the proximal end arm 52 shown in FIG. 3. In addition, the bent portion 55 may be provided at a position different from the proximal end arm 52, for example, at the distal end arm 53.

The position and shape of the bent portion 55 in the second outrigger 50R are the same as those of the bent portion 55 in the first outrigger 50L. That is, the bent portion 55 of the first outrigger 50L and the bent portion 55 of the second outrigger 50R are provided at the same positions in the length direction Y.

The bent portions 55 of the outriggers 50L and 50R have the function of suppressing the vibrations (sympathetic vibrations) of the flexure 30. In in the flexure 30, various modes of vibration can occur. Representative examples of the vibration modes include a first torsion mode, a second torsion mode, and a third torsion mode.

Figure 6:
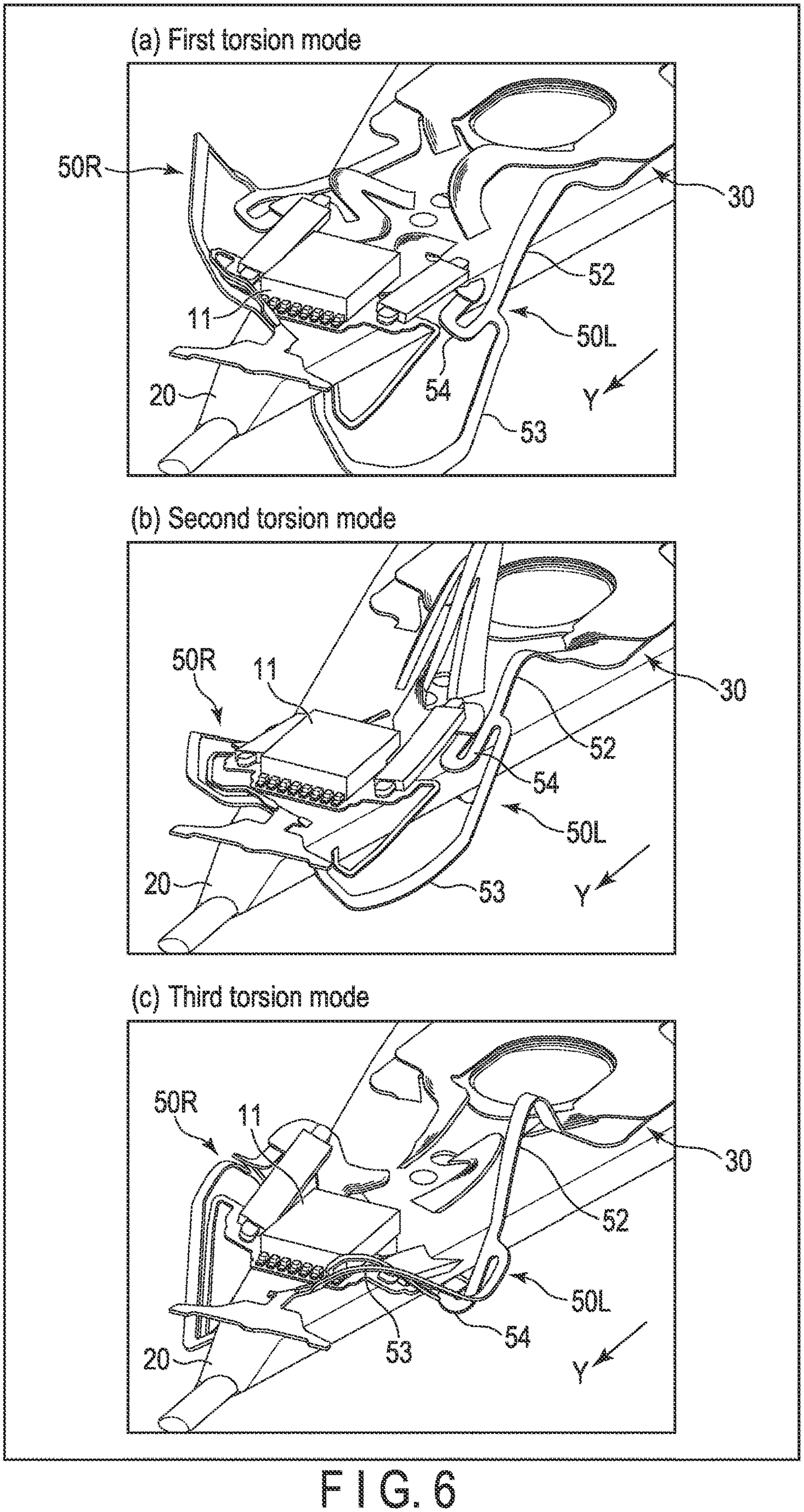
FIG. 6 is a schematic perspective view showing the flexure which vibrates in (a) a first torsion mode, (b) a second torsion mode, and (c) a third torsion mode, together with the load beam.
Figure 7:
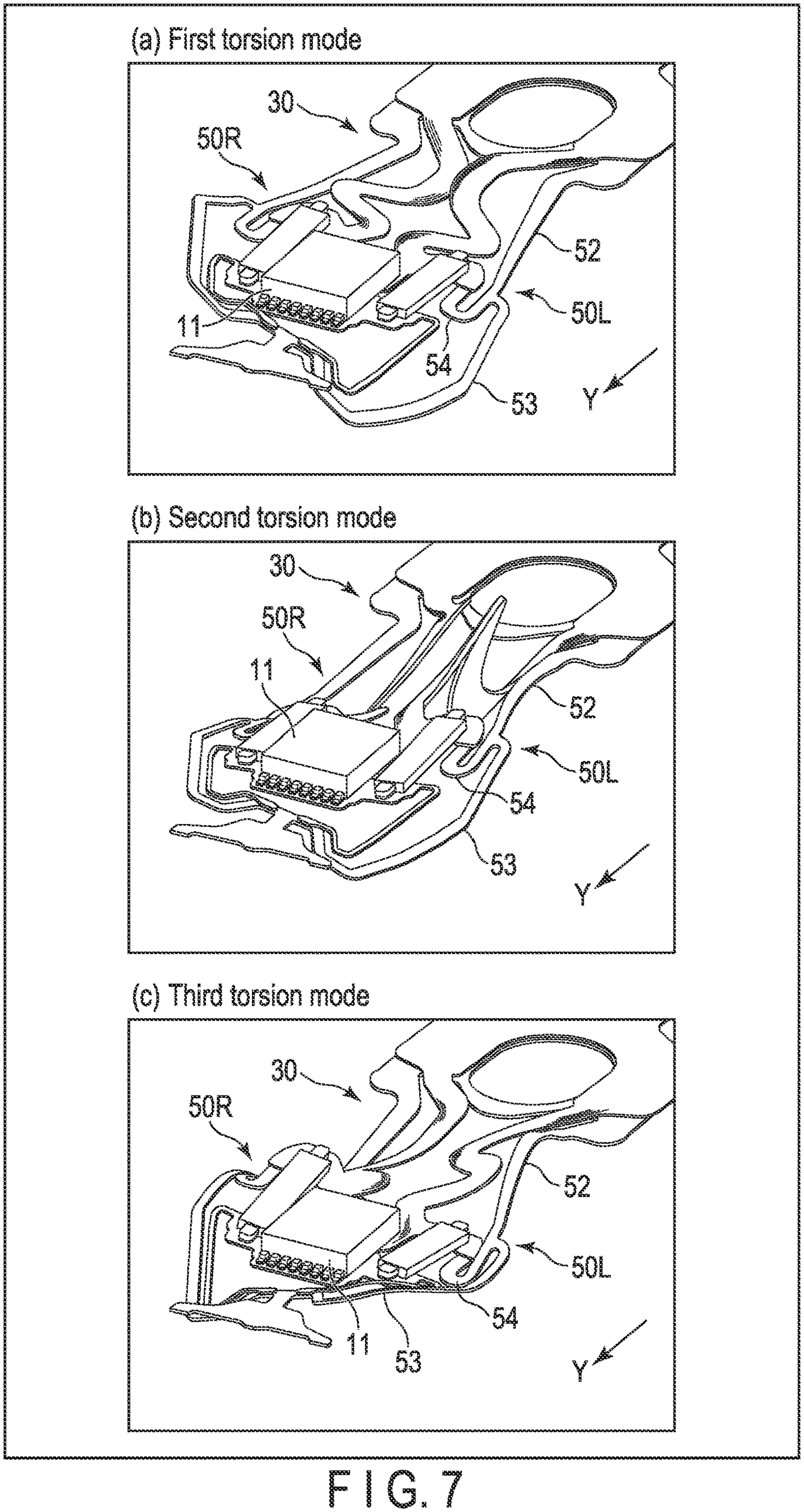
FIG. 7 is a schematic perspective view of the flexure which vibrates in (a) the first torsion mode, (b) the second torsion mode, and (c) the third torsion mode.

FIG. 6 and FIG. 7 are schematic perspective views of the flexure 30, which vibrates in (a) the first torsion mode, (b) the second torsion mode, and (c) the third torsion mode. FIG. 6 shows the load beam 20 together with the flexure 30. In contrast, FIG. 7 does not show the load beam 20.

In the first torsion mode shown in parts (a) of FIG. 6 and FIG. 7, the outriggers 50L and 50R are deformed to have one peak (mountain or valley). For example, in part (a) of FIG. 6, the first outrigger 50L is curved to make the middle part of the distal end arm 53 project downward.

In the second torsion mode shown in parts (b) of FIG. 6 and FIG. 7, the outriggers 50L and 50R are deformed to have two peaks (mountains or valleys). For example, in part (b) of FIG. 6, the first outrigger 50L is curved to make the middle part of the proximal end arm 52 project upward and to make the middle part of the distal end arm 53 project downward.

In the third torsion mode shown in parts (c) of FIG. 6 and FIG. 7, the outriggers 50L and 50R are deformed to have three peaks (mountains or valleys). For example, in part (c) of FIG. 6, the first outrigger 50L is curved to make the middle part of the proximal end arm 52 project upward, to make the vicinity of the connection portion 54 project downward, and to make the middle part of the distal end arm 53 project upward.

The specific position where the bent portions 55 are formed in the outriggers 50L and 50R can be determined by considering the various vibration modes including the first to third torsion modes altogether.

Figure 8:
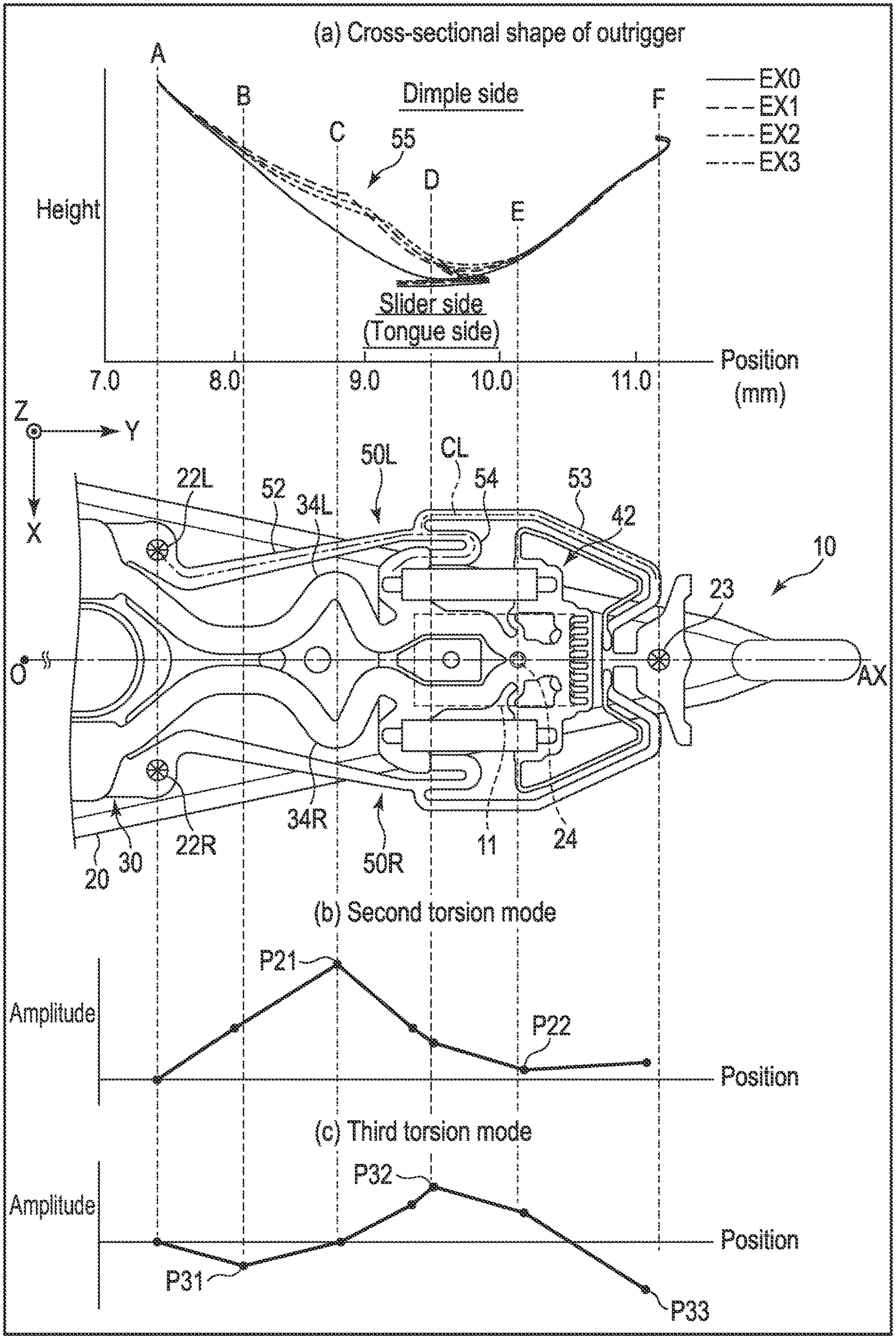
FIG. 8 is a diagram showing a specific example of the formation position of the bent portions in the suspension according to the embodiment.

FIG. 8 is a diagram showing a specific example of the formation position of the bent portions 55 in the suspension 10 according to the present embodiment. FIG. 8 shows (a) a graph showing the cross-sectional shape of the first outrigger 50L, (b) a graph showing the amount of displacement (amplitude) of the first outrigger 50L in the second torsion node, and (c) a graph showing the amount of displacement (amplitude) of the first outrigger 50L in the third torsion mode, together with a plan view of the suspension 10.

In the graph of part (a) of FIG. 8, the horizontal axis represents the position [mm] in the length direction V when the origin O is defined as a point of reference (zero), and the vertical axis represents the height measured when the direction from the slider 11 toward the dimple 24 (direction from the tongue 42 toward the dimple 24) is defined as an upward direction. The origin O corresponds to the center of a portion coupling the suspension 10 and the arm 8 shown in FIG. 1. For example, the origin O is the centers of the boss portions 12*a* provided on the base plates 12 described above.

The graph shown in part (a) of FIG. 8 shows curves of Comparative Example EX0 and Examples EX1, EX2, and EX3. The curves each represent the shape of the first outrigger 50L along line CL made on the first outrigger 50L. To be specific, Comparative Example EX0 corresponds to the shape of the first outrigger 50L which is not provided with the bent portion 55, and Examples EX1, EX2, and EX3 correspond to the shapes of the first outriggers 50L which are provided with the bent portions 55 at different positions, respectively.

In the graph of part (a) of FIG. 8, to make the cross-sectional shapes of the first outriggers 50L understood more clearly, the amounts of change (scales) of the vertical axis are made larger than those of the horizontal axis. As can be seen from the curve of Comparative Example EX0, with the flexure 30 mounted on the load beam 20, the first outrigger 50L curves to reach its peak in the vicinity of the tongue 42 even if the bent portion 55 is not provided.

In the graphs of parts (b) and (c) of FIG. 8, the horizontal axes represent the position in the length direction Y as in part (a) of FIG. 8, and the vertical axes represent the amplitude of the first outrigger 50L at the time of vibration. These graphs shew schematic vibrations in each mode.

The amplitude of the second torsion mode exemplified in part (b) of FIG. 8 has a peak P21 in the proximal end arm 52 and has a peak P22 in the distal end arm 53. The amplitude of the third torsion mode exemplified in part (c) of FIG. 8 has a peak P31 in the proximal end arm 52, has a peak P32 in the vicinity of the connection portion 54, and has a peak P33 in the vicinity of the end portion of the distal end arm 53.

As indicated by broken lines in FIG. 8, positions A, B, C, D, E, and F arranged in order in the length direction Y are defined. The position A passes through the centers of the first fixing portions 22L and 22R. The position B corresponds to the position of the peak P31 in the amplitude of the third torsion mode. The position C corresponds to the position of the peak P21 in the amplitude of the second torsion mode. In addition, the position C also overlaps the positions at which the unsupported circuit, portions 34L and 34R are bent to project in the width direction X.

The position D corresponds to the position of the peak P32 in the amplitude of the third torsion mode. In addition, the position D also overlaps the vicinities of the border between the tongue 42 and the connection portion 54 and the border between the proximal end arm 52 and the distal end arm 53. The position E passes through the dimple 24. The position F passes through the second fixing portion 23.

The inventors have studied the formation position of the bent portions 55 in consideration of various types of vibration mode in the suspension 10 according to the present embodiment. Aa a result, it has been proved that the vibrations of the flexure 30 can be suppressed excellently by providing the bent portions 55 of the outriggers 50L and 50R between the positions A and E. Moreover, if the bent portions 55 are provided between the positions B and D, the effect of suppressing vibrations can further increase.

In each of Examples EX1, EX2, and EX3 shown in part (a) of FIG. 8, the bent portion 55 is provided between the positions B and D, more specifically, between the positions C and D. The bent portion 55 in Example EX2 is closer to the position D than the bent portion 55 in Example EX1. In addition, the bent portion 55 in Example EX3 is closer to the position D than the bent portion 55 in Example EX2.

In the following description, an adjustment method of the vibration characteristics of the suspension 10 by the bent portions 55 and a manufacturing method of the suspension 10 will be explained.

Figure 9:
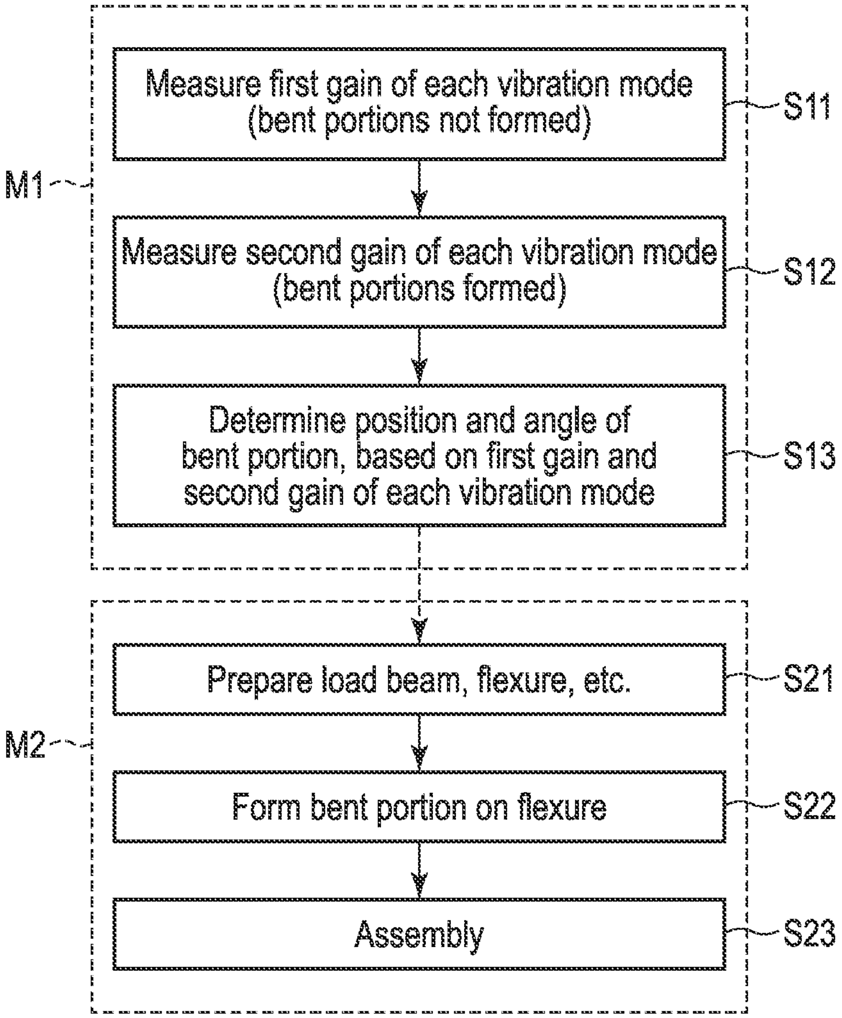
FIG. 9 is a flowchart showing an example of a method of adjusting the vibration characteristics and a method of manufacturing the suspension according to the embodiment.

FIG. 9 is a flowchart showing examples of the adjustment method M1 and the manufacturing method M2. The adjustment method M1 determines the formation position and the bending angle of the bent portions 55 and is executed before the suspension 10 is manufactured. In the manufacturing method M2, a manufacturing line is sot to achieve the formation position and the bending angle of the bent portions 55 determined by the adjustment method M1, and the suspension 10 is manufactured.

In the adjustment method M1, the gain of the flexure 30 (outriggers 50L and 50R) in vibration nodes of the suspension 10, in which the bent portions 55 are not formed, is measured first (step S11). The gain measured in step S11 will be hereinafter referred to as a first gain.

Then, the gain of the flexure 30 (outriggers 50L and 50R) in vibration modes of the suspension 10, in which the bent portions 55 are formed, is measured (step S12). The gain measured in step S12 will be hereinafter referred to as a second gain.

The measurement in steps S11 and S12 can be carried out by, for example, a simulation using a three-dimensional model of the suspension 10. The measurement in these steps may be carried out using a sample of the suspension 10 that is actually manufactured. The vibration modes whose gains are measured in steps S11 and S12 are, for example, the above-described first, second, and third torsion modes.

The present embodiment assumes, for example, the case where the second gain of each of the first, second, and third torsion modes is measured by using a plurality of types of three-dimensional model or sample with the formation positions and bending angles of the bent portions 55 made different from each other.

Figure 10:
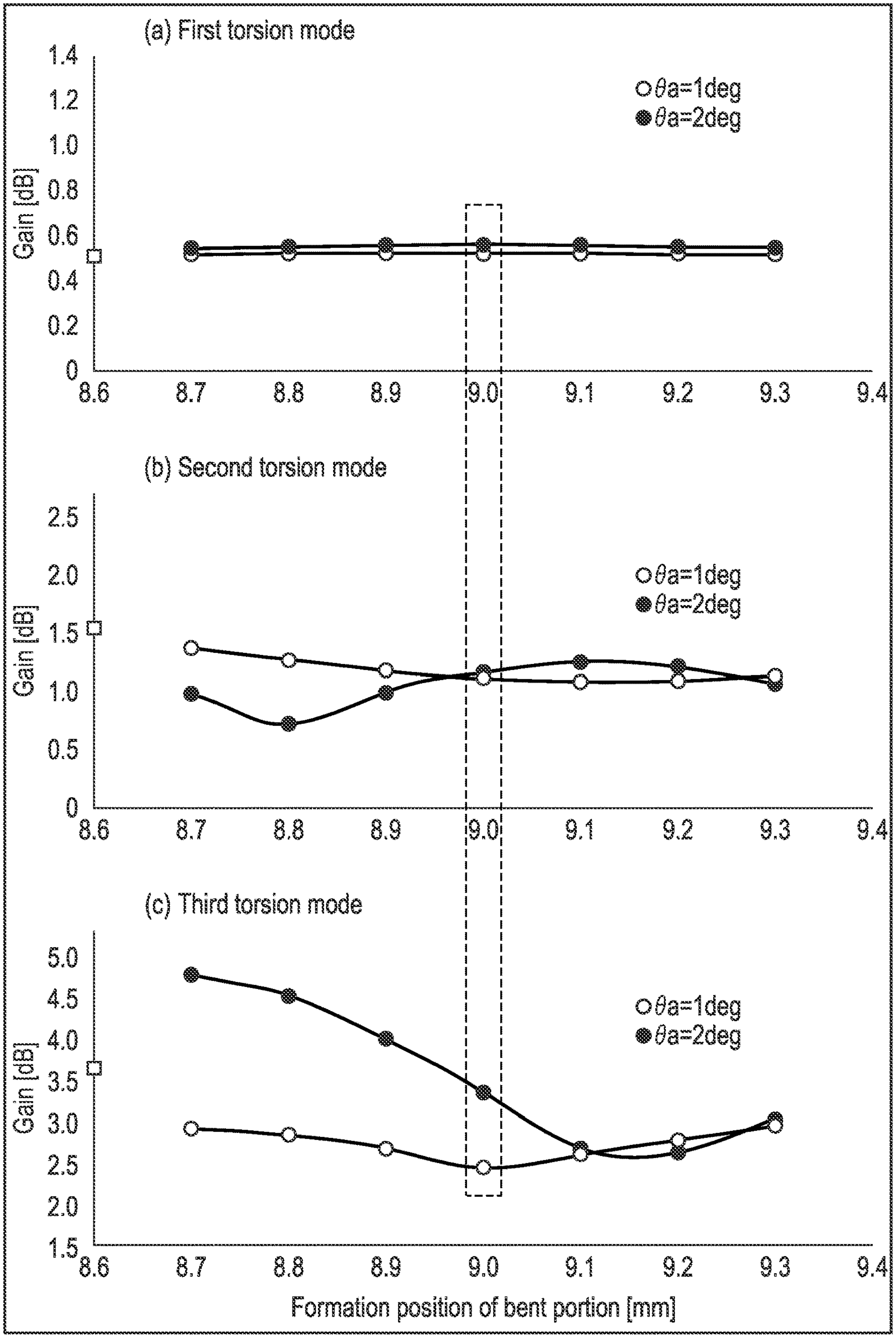
FIG. 10 is a diagram showing an example of results obtained by measuring a first gain and a second gain of the suspension according to the embodiment.

FIG. 10 is a diagram showing an example of results obtained by measuring the first and second gains of the suspension 10 according to the present embodiment. FIG. 10 shows the first and second gains measured in each of (a) the first torsion node, (b) the second torsion mode, and (c) the third torsion mode.

In parts (a), (b), and (c) or FIG. 10, the horizontal exes represent the formation position [mm] in the length direction Y of the bent portions 55, and the origin O is defined as a point of reference (zero) as in part (a) of FIG. 8. In addition, the vertical axes represent the gains [dB]. The range of the formation position shown in parts (a), (b), and (c) of FIG. 10 corresponds to part of the space between the positions B and D in FIG. 8.

In parts (a), (b), and (c) of FIG. 10, square plots overlapping the vertical axes represent the first gain, white circular plots represent the second gain in the case where a bending angle θa is 1°, and black circular plots represent the second gain in the case where the bending angle θa is 2°.

The bending angle θa is an angle in the case where the bent portions 55 are formed on the flexure 30 before the flexure 30 is mounted on the load beam 20. With the flexure 30 mounted on the load beam 20, the outriggers 50L and 50R curve as shown in part (a) of FIG. 8. Accordingly, the bending angle θa can be slightly different from the bending angle θ shown in FIG. 5.

As can be seen from part (a) of FIG. 10, in the first torsion mode, the second gain hardly change even if the formation position and the bending angle θa of the bent portions 55 are changed. This second gain is substantially equal to the first gain at any formation position.

As shown in part (b) of FIG. 10, in the second torsion mode, the second gain is smaller than the first gain on the whole in both cases where the bending angle θa is 1° and 2°. The second gain in the case where the bending angle θa is 1° is smallest in the vicinity of 9.1 mm. The second gain in the case where the bending angle θa is 2° is smallest in the vicinity of 8.8 mm.

As shown in part (c) of FIG. 10, in the third torsion mode, the second gain in the case where the bending angle θa is 1° is smaller than the first gain on the whole. In contrast, the second gain in the case where the bending angle θa is 2° is larger than the first, gain. The second gain in the case where the bonding angle θa is 1° is smallest in the vicinity of 9.0 mm. The second gain in the case where the bending angle θa is 2° is smallest in the vicinity of 9.2 mm.

After the first and second gains are measured in steps S11 and S12 shown in FIG. 9, the formation position and the bending angle θa of the bent portions 55 in the suspension 10 to be actually manufactured are determined on the basis of these gains (step S13). This determination can be carried out on various conditions. For example, the formation position and the bending angle θa with which the second gain is less than or equal to the first gain in at least one of the vibration modes whose gains have been measured, preferably in more than half the vibration modes, are selected.

If the first, and second gains as shown in parts (a), (b), and (c) of FIG. 10 are obtained, the first torsion mode, in which the fluctuation of the second gain is small, is excluded from consideration, and the formation position and the bending angle θa can be determined mainly on the basis of the second gains in the second and third torsion modes.

For example, if it is necessary to suppress especially vibrations in the third torsion mode, the formation position may be determined to be 9.0 mm as enclosed in a broken-line frame. Moreover, at 9.0 mm, in both of the second and third torsion modes, the second gains in the case where the bending angle θa is 1° are smaller than the second gains in the case where the bending angle θa is 2°. Thus, the bending angle θa may be determined to be 1°. On this condition, the second gain is less than the first gain also in the second torsion mode. Accordingly, in both of the second and third torsion modes, the vibrations of the flexure 30 can be reduced by the bent portions 55.

In the manufacturing method M2 of the suspension 10 shown in FIG. 9, structural elements of the suspension 10 such as the load beam 20 and the flexure 30 are prepared first (step S21). Then, in the flexure 30, which is yet to be mounted on the load beam 20, the bent portions 55 of the bending angle θa determined in step S13 are formed at the formation position determined in step S13 (step S22).

The bent portions 55 can be formed by, for example, pressing with a mold or laser irradiation of the outriggers 50L and 50R. For example, if the bent portions 55 having the shape shown in FIG. 5 are formed by laser irradiation, a laser beam is irradiated to the second faces F2 by a laser irradiation device. At this time, an irradiated area of the laser beam is heated and when the irradiated area is cooled after that, the outriggers 50L and 50R are deformed to make the second faces F2 concave (make the first faces F1 convex). In this manner, the bent portions 55, at which the outriggers 50L and 50R are bent to make the first faces F1 convex, can be obtained.

After the bent portions 55 are formed, elements such as the load beam 20 and the flexure 30 are assembled, and the suspension 10 having excellently adjusted vibration characteristics is completed (step S23).

Although FIG. 9 shows the case where elements such as the load beam 20 and the flexure 30 are assembled after the bent portions are formed in the flexure, the bent portions may be formed after elements such as the load beam 20 and the flexure 30 are assembled.

In addition, the explanation of FIG. 9 assumes the case where the formation position and the bending angle θa of the bent portions 55 are determined in consideration of the first, second, and third torsion modes. However, the present embodiment is not limited to this example. In the determination of the formation position and the bending angle θa of the bent portions 55, other vibration modes of the flexure 3 may be taken into consideration in addition to or instead of the first, second, and third torsion modes. Furthermore, not only the vibration modes of the flexure 30 but also the coupling modes with the vibrations of the load beam 20 may be taken into consideration. The bending angle θa is not limited to 1° or 2°. For example, the bending angle θa can be determined in the range of 0.5° to 3°.

According to the above-described present embodiment, the outriggers 50L and 50R are provided with the bent portions 55, and the suspension 10 with the vibrations in the vicinity of the gimbal portion 43 effectively suppressed thereby can be obtained.

If the vibration characteristics ere adjusted by the bent portions 55 of the outriggers 50L and 50R in this manner, the stiffness of the flexure 30, etc., hardly changes, as compared to, for example, that in the case where a damper member is attached to the flexure 30. That is, it is possible to improve the vibration characteristics while suppressing the influence on gimbal movement. In addition, because an additional component such as a damper member and its mounting step are unnecessary, an increase of the manufacturing cost of the suspension 10 also can be suppressed.

In addition to the above-described effects, various favorable effects can be obtained from the present embodiment.

The above-described embodiment, does not limit the scope of the present invention to the structure disclosed in the present embodiment. The present invention can be carried out by modifying the structure disclosed in the embodiment into various forms.

For example, the above-described embodiment exemplifies the case where the outriggers 50L end 50R are bent at the bent portions 55 to make the first faces F1 convex as shown in FIG. 5. However, if the vibration characteristics are improved excellently, the outriggers 50L and 50R may be bent to make the second faces F2 convex.

In addition, the above-described embodiment assumes the case where a bent portion 55 is provided at only one position in each of the outriggers 50L and 50R. However, if the vibration characteristics are improved excellently, bent portions 55 may be provided at positions in each or the outriggers 50L and 50R.

Furthermore, the above-described embodiment exemplifies the case where the formation position and the bending angle θa of the bent portions 55 are determined by the adjustment method M1 shown in FIG. 9. As another example, the bending angle θa may be determined in advance to determine the formation position of the bent portions 55 of the bending angle θa by the adjustment method M1. For example, in step S12 of this case, the second gain in the case where the bent portions 55 are formed on the outriggers 50L and 50R in vibration modes is measured for each of the positions on the outriggers 50L and 50R at which the bent portions 55 are formed. Moreover, in step S13, a position with which the second gain smaller then the first gain is obtained in at least one of the vibration modes, of the above positions, is determined as the formation position of the bent portions 55 applied to the suspension 10 to be actually manufactured.

In addition, the formation position of the bent portions 55 may be determined in advance to determine the bending angle θa on the assumption that the bent portions 55 are formed at the determined formation position by the adjustment method M1. For example, in step S12 of this case, the second gain in the case where the bent portions 55 are formed at the formation position in vibration modes is measured for each of the bending angles θa of the bent portions 55. Furthermore, in step S13, an angle with which the second gain smaller than the first gain is obtained in at least one of the vibration modes, of the bending angles θa, is determined as the bending angle θa of the bent portions 55 applied to the suspension 10 to be actually manufactured.

What is claimed is:

1. A disk drive suspension comprising:

a load beam extending in a length direction and comprising a dimple; and a flexure overlaid on the load beam in a thickness direction of the load beam, the thickness direction intersecting the length direction, wherein:

the load beam includes a side edge in a width direction, the width direction intersecting the length direction and the thickness direction, the load beam and the flexure are fixed by a first fixing portion and a second fixing portion closer to a distal end of the load beam than the first fixing portion, the flexure comprises:

a tongue opposed to the dimple in the thickness direction; and an outrigger connected to the tongue, the outrigger includes:

a first portion opposed to the load beam in the thickness direction; and a second portion projected in the width direction beyond the side edge of the load beam, the first portion and the second portion are located between the dimple and the first fixing portion in the length direction, the outrigger is bent in the thickness direction of the load beam at a bent portion, the bent portion is provided at the first portion or the second portion, and one of two parts of the outrigger divided by the bent portion is connected to the first fixing portion, and the other of the two parts of the outrigger is connected to the tongue or to the second fixing portion.

2. The disk drive suspension of claim 1, wherein the bent portion is located between the tongue and the first fixing portion in the length direction.

3. The disk drive suspension of claim 1, wherein:

the outrigger comprises a first face, at least part of which is opposed to the load beam, and a second face opposite to the first face in the thickness direction, the outrigger is bent at the bent portion to make the first face convex, and a bending angle of the outrigger at the bent portion is 0.5° to 3°.

4. The disk drive suspension of claim 1, wherein:

the outrigger includes a first outrigger and a second outrigger, the first outrigger and the second outrigger being arranged in the width direction, the tongue is located between the first outrigger and the second outrigger in the width direction, and each of the first outrigger and the second outrigger comprises the bent portion.

5. The disk drive suspension of claim 1, wherein the bent portion is provided at the first portion.

6. The disk drive suspension of claim 1, wherein the bent portion is provided at the second portion.

7. The disk drive suspension of claim 1, wherein the other of the two parts of the outrigger is connected to the tongue.

8. The disk drive suspension of claim 1, wherein the other of the two parts of the outrigger is connected to the second fixing portion.

9. An adjustment method of a vibration characteristic of the disk drive suspension of claim 1, the adjustment method comprising:

measuring a first gain of the flexure in a case where the bent portion is not formed on the outrigger in a specific vibration mode;

measuring a second gain of the flexure in a case where the bent portion is formed on the outrigger in the specific vibration mode, the second gain being measured for each of a plurality of positions on the outrigger at which the bent portion is formed; and determining a position among the positions with which the second gain being smaller than the first gain is obtained as a formation position of the bent portion applied to the disk drive suspension to be manufactured.

10. The adjustment method of claim 9, further comprising:

measuring the first gain and the second gain of each of the positions for each of a plurality of vibration modes; and determining a position among the positions with which the second gain being smaller than the first gain is obtained in at least one of the vibration modes as the formation position of the bent portion applied to the disk drive suspension to be manufactured.

11. An adjustment method of a vibration characteristic of the disk drive suspension of claim 1, the adjustment method comprising:

measuring a first gain of the flexure in a case where the bent portion is not formed on the outrigger in a specific vibration mode;

measuring a second gain of the flexure in a case where the bent portion is formed on the outrigger in the specific vibration mode, the second gain being measured for each of a plurality of bending angles of the outrigger at the bent portion; and determining a bending angle among the bending angles with which the second gain being smaller than the first gain is obtained as a bending angle at the bent portion applied to the disk drive suspension to be manufactured.

12. The adjustment method of claim 11, further comprising:

measuring the first gain and the second gain of each of the bending angles for each of a plurality of vibration modes;

determining a bending angle among the bending angles with which the second gain being smaller than the first gain is obtained in at least one of the vibration modes as the bending angle at the bent portion applied to the disk drive suspension to be manufactured.

13. A manufacturing method of manufacturing the disk drive suspension whose vibration characteristic is adjusted by the adjustment method of claim 9, wherein the manufacturing method comprises:

manufacturing the disk drive suspension.

* * * * *